US012688245B2

(12) United States Patent
Sun et al.

(10) Patent No.: US 12,688,245 B2
(45) Date of Patent: Jul. 21, 2026

(54) GENERATIVE KNOWLEDGE SEARCH ENGINE FOR MULTI-QUERY ENABLED NETWORK KNOWLEDGE COMPLETION

(71) Applicant: Cisco Technology, Inc., San Jose, CA (US)

(72) Inventors: Pengfei Sun, Reno, NV (US); Daniel Shan-Shea Chen, Potomac, MD (US); Qihong Shao, Clyde Hill, WA (US); Di Meng, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 239 days.

(21) Appl. No.: 18/350,374

(22) Filed: Jul. 11, 2023

(65) Prior Publication Data

US 2024/0386066 A1     Nov. 21, 2024

Related U.S. Application Data

(60) Provisional application No. 63/502,962, filed on May 18, 2023.

(51) Int. Cl.
| | |
|---|---|
| *G06F 16/9536* | (2019.01) |
| *G06N 5/022* | (2023.01) |
| *G06Q 10/087* | (2023.01) |

(52) U.S. Cl.
CPC ......... *G06F 16/9536* (2019.01); *G06N 5/022* (2013.01); *G06Q 10/087* (2013.01)

(58) Field of Classification Search
None
See application file for complete search history.

(56) References Cited

U.S. PATENT DOCUMENTS

| | | | | | |
|---|---|---|---|---|---|
| 10,460,320 | B1 * | 10/2019 | Cao | ......................... | G06N 20/10 |
| 10,713,252 | B1 * | 7/2020 | Bourne | ............... | G06F 16/9024 |

(Continued)

FOREIGN PATENT DOCUMENTS

| | | | | |
|---|---|---|---|---|
| WO | WO-2020147594 A1 * | 7/2020 | ......... | G06F 16/9024 |
| WO | 2023/284716 A1 | 1/2023 | | |

OTHER PUBLICATIONS

Khan, et al., "Neighborhood Based Fast Graph Search in Large Networks," SIGMOD'11, Jun. 2011, 12 pages.

(Continued)

*Primary Examiner* — Fateh M Obaid

(74) *Attorney, Agent, or Firm* — Edell, Shapiro & Finnan, LLC

(57)          ABSTRACT

Methods are provided for generating end-to-end solutions-based search results for multi-query search inquiry. The search results are generated using graph generative pre-trained transformers and a network knowledge base. A method involves obtaining at least one search query and inventory data that includes information about a plurality of enterprise assets and configuration of an enterprise network. The method further includes generating a contextual schema based on the inventory data. The contextual schema includes a plurality of query sub-graphs indicative of an intention of the at least one search query and generating a solution graph by performing machine learning with respect to the plurality of query sub-graphs and network domain knowledge data. The method further includes providing a response to the at least one search query based on the solution graph. The response is specific to the enterprise network.

20 Claims, 11 Drawing Sheets

900

(56) References Cited

U.S. PATENT DOCUMENTS

| | | | | |
|---|---|---|---|---|
| 10,915,577 | B2 * | 2/2021 | Srinivasan | G06F 16/81 |
| 11,669,556 | B1 * | 6/2023 | Hasan | G06F 16/9024 |
| | | | | 707/736 |
| 2008/0263006 | A1 * | 10/2008 | Wolber | G06F 16/2471 |
| 2012/0221558 | A1 * | 8/2012 | Byrne | G06F 16/9024 |
| | | | | 707/723 |
| 2015/0339392 | A1 * | 11/2015 | Reineck | G06F 16/9532 |
| | | | | 707/710 |
| 2018/0213062 | A1 | 7/2018 | Muthyala et al. | |
| 2018/0218011 | A1 | 8/2018 | Taycher et al. | |
| 2019/0332956 | A1 * | 10/2019 | Ankisettipalli | H04L 51/18 |
| 2020/0050623 | A1 * | 2/2020 | Hartlaub | G06F 16/437 |
| 2020/0097560 | A1 * | 3/2020 | Kulkarni | G06F 16/24578 |
| 2020/0137083 | A1 * | 4/2020 | Chen | G06N 3/09 |
| 2020/0177616 | A1 * | 6/2020 | Hadar | H04L 63/1433 |
| 2020/0184347 | A1 | 6/2020 | Lindsley | |
| 2020/0265325 | A1 | 8/2020 | Gabaldon Royval et al. | |
| 2022/0019579 | A1 * | 1/2022 | Meyerzon | G06N 3/09 |
| 2022/0019622 | A1 * | 1/2022 | Meyerzon | G06F 16/367 |
| 2022/0019740 | A1 * | 1/2022 | Meyerzon | G06F 16/313 |
| 2022/0019905 | A1 * | 1/2022 | Meyerzon | G06F 16/2465 |
| 2023/0028381 | A1 | 1/2023 | Meyerzon et al. | |
| 2024/0311483 | A1 * | 9/2024 | Davraev | G06F 21/55 |

OTHER PUBLICATIONS

Yao, et al., "KG-BERT: BERT for Knowledge Graph Completion," https://arxiv.org/pdf/1909.03193, Sep. 2019, 8 pages.

Cui, et al., "KBQA: Learning Question Answering over QA Corpora and Knowledge Bases," Proceedings of the VLDB Endowment, vol. 10, No. 5, https://arxiv.org/pdf/1903.02419, Mar. 2019, 12 pages.

Xian, et al., "Reinforcement Knowledge Graph Reasoning for Explainable Recommendation," SIGIR '19, https://arxiv.org/pdf/1906.05237, Jun. 2019, 10 pages.

Reinanda, et al., "Knowledge Graphs: An Information Retrieval Perspective," Foundations and Trends® in Information Retrieval, vol. 14, Issue 4, Oct. 2020, 37 pages.

Uyar, et al., "Evaluating search features of Google Knowledge Graph and Bing Satori: entity types, list searches and query interfaces," http://dx.doi.org/10.1108/OIR-10-2014-0257, Mar. 2015, 27 pages.

Song, et al., "Mining Summaries for Knowledge Graph Search," 2016 IEEE 16th International Conference on Data Mining (ICDM), Dec. 2016, 14 pages.

Su, et al., "Exploiting Relevance Feedback in Knowledge Graph Search," KDD'15, Aug. 2015, 10 pages.

Ma, et al., "Big Graph Search: Challenges and Techniques," https://arxiv.org/pdf/1411.4266, Nov. 2014, 12 pages.

* cited by examiner

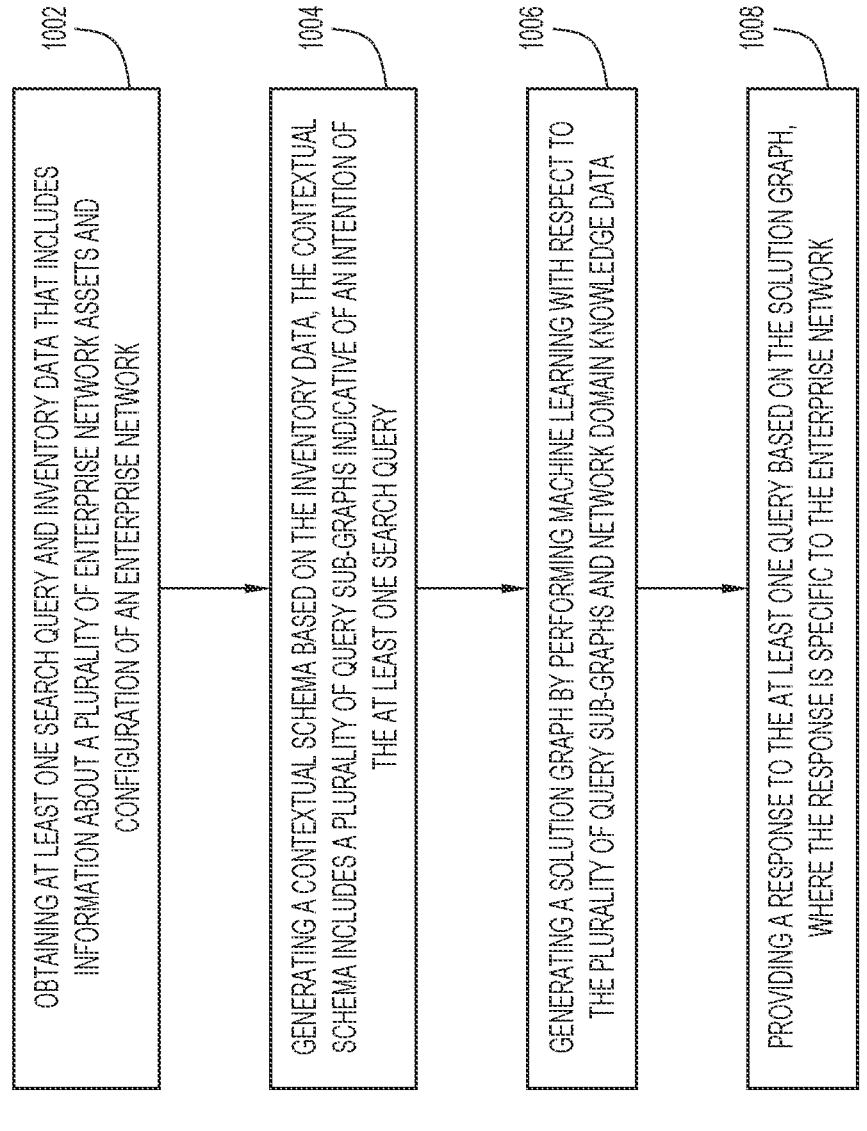

1000

1002

OBTAINING AT LEAST ONE SEARCH QUERY AND INVENTORY DATA THAT INCLUDES INFORMATION ABOUT A PLURALITY OF ENTERPRISE NETWORK ASSETS AND CONFIGURATION OF AN ENTERPRISE NETWORK

1004

GENERATING A CONTEXTUAL SCHEMA BASED ON THE INVENTORY DATA, THE CONTEXTUAL SCHEMA INCLUDES A PLURALITY OF QUERY SUB-GRAPHS INDICATIVE OF AN INTENTION OF THE AT LEAST ONE SEARCH QUERY

1006

GENERATING A SOLUTION GRAPH BY PERFORMING MACHINE LEARNING WITH RESPECT TO THE PLURALITY OF QUERY SUB-GRAPHS AND NETWORK DOMAIN KNOWLEDGE DATA

1008

PROVIDING A RESPONSE TO THE AT LEAST ONE QUERY BASED ON THE SOLUTION GRAPH, WHERE THE RESPONSE IS SPECIFIC TO THE ENTERPRISE NETWORK

FIG. 10

GENERATIVE KNOWLEDGE SEARCH ENGINE FOR MULTI-QUERY ENABLED NETWORK KNOWLEDGE COMPLETION

CROSS-REFERENCE TO RELATED APPLICATION

This application claims the benefit of priority under 35 U.S.C. § 119 (e) to U.S. Provisional Patent Application No. 63/502,962, entitled "GENERATIVE KNOWLEDGE SEARCH ENGINE FOR MULTI-QUERY ENABLED NETWORK KNOWLEDGE COMPLETION," filed on May 18, 2023, which is hereby incorporated by reference in its entirety.

TECHNICAL FIELD

The present disclosure generally relates to computer networks and systems.

BACKGROUND

Enterprise networks include many assets and involve various enterprise service functions for equipment and software. Enterprise networks are often managed by a team of information technology (IT) specialists. This is particularly the case for enterprises that have large networks or systems of numerous instances and types of equipment and software. Enterprise assets may encounter various issues such as defects, obsolescence, configurations, workarounds, etc. Many issues are reported from various vendors and other sources. Understanding enterprise network, its features, and/or assets is difficult. Further, addressing IT issues that may arise in the enterprise network is complicated and requires understanding of the enterprise network, its assets, and its services.

BRIEF DESCRIPTION OF THE DRAWINGS

FIG. 10 is a flow diagram illustrating a method of providing a response based on a solution graph generated by the GSE, according to an example embodiment.

DESCRIPTION OF EXAMPLE EMBODIMENTS

Overview

Figure 1:
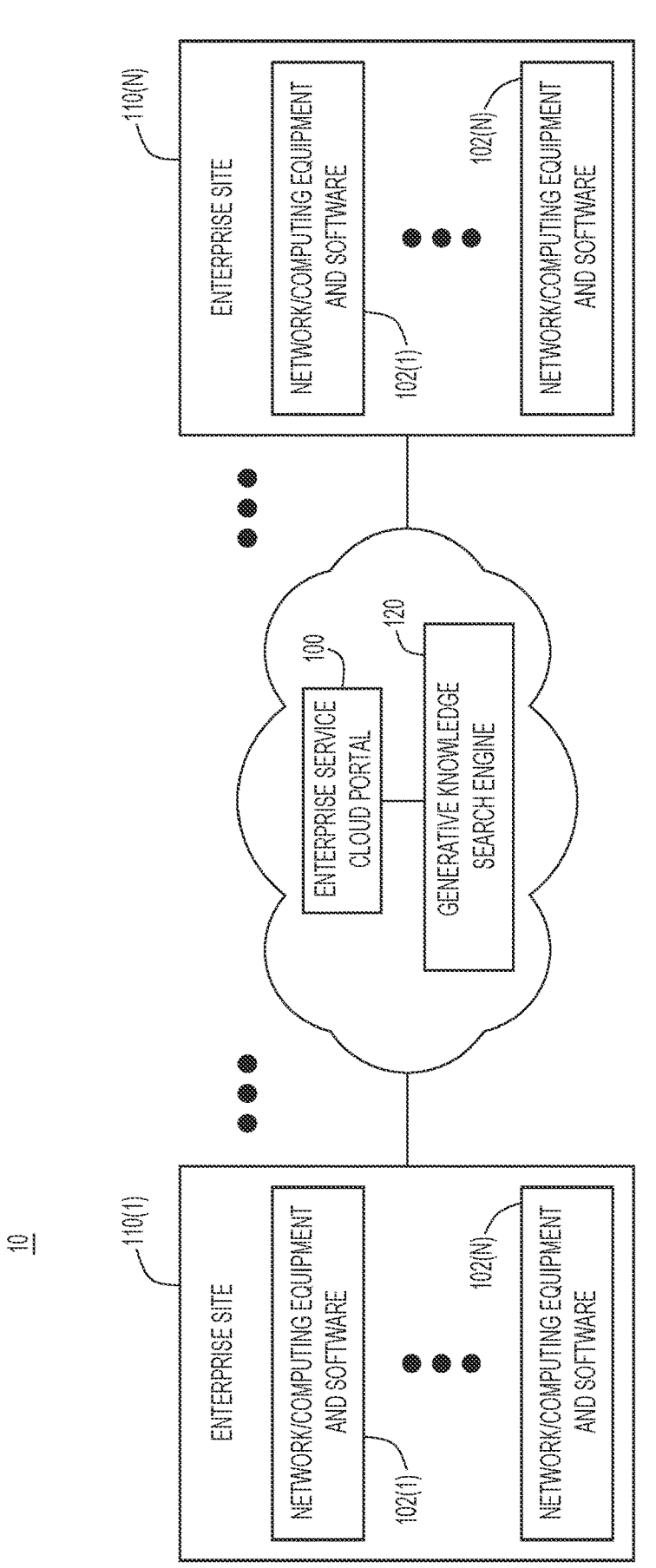
FIG. 1 is a block diagram of a system that includes a generative knowledge search engine (GSE) that interacts with an enterprise service cloud portal and network/computing equipment and software residing at various enterprise sites of an enterprise network domain, according to an example embodiment.

Briefly, methods are presented which provide end-to-end solutions-based search results for multi-query inquiries. The search results are generated using graph generative pre-trained transformers and a network knowledge base.

In one form, a method includes obtaining at least one search query and inventory data that includes information about a plurality of enterprise assets and configuration of an enterprise network. The method further includes generating a contextual schema based on the inventory data. The contextual schema includes a plurality of query sub-graphs indicative of an intention of the at least one search query. The method further includes generating a solution graph by performing machine learning with respect to the plurality of query sub-graphs and network domain knowledge data and providing a response to the at least one search query based on the solution graph. The response is specific to the enterprise network.

EXAMPLE EMBODIMENTS

One of the most valuable functionalities that network enterprises are looking for is to have a comprehensive understanding of their network features after acquiring thousands of devices or enterprise assets (e.g., router, switch, etc.) from various providers. Traditional pattern-matching based keyword/graph search engines provide only some basic network understanding but may not adequately meet the enterprise's needs. That is, traditional pattern-matching based keyword/graph search engines are not good enough for network understanding due to at least the following limitations.

First, traditional search engines do not reflect "latent" correlations. That is, pattern-matching-based information retrieval often collects entities from the database using a rule-based methodology deficit on capturing the latent correlations, resulting in fragmented knowledge. In contrast, modern network systems are becoming increasingly interconnected, with operations and device behaviors that interact with each other. To address the latent connections among vast amounts of highly tangled knowledge in the network domain, search results must be in a format to reflect the underlying insights.

Second, traditional search engines do not provide solution-based outputs. The query results based on pattern-matching lack summarization at the solution level. With an overwhelming amount of information available, users may struggle to retrieve relevant solutions obscured by complex descriptions of these systems or be unable to digest the sheer volume of information. A domain such as network management, which has a steep learning curve, requires a search engine that presents solutions rather than a large list of entries for exploration.

Third, traditional search engines lack understanding of user's intentions. Traditional search engines customize search results based on search history. However, simply traversing through a list of keywords is often insufficient for revealing the user's real intention. Shallow customization based on limited user records cannot capture the full context of the business setting including the assets or service portfolio, resulting in a lack of understanding of the user's intention.

Graph searching has recently become popular as heterogeneous datasets and non-tabular databases evolved. Unlike traditional search engines that match strings to documents or queries to tabular databases, graph searching matches heterogeneous, semantic information with context-rich representations. Moreover, graph searching can utilize the neighborhood correlations to complete missing values in the responses to the submitted query. Thus far, graph searching is used for a variety of tasks, including answering questions, recommendation systems, and information retrieval.

In many domain-specific scenarios, such as medicine, cyber security, news, and education, graph searching demonstrates its advantages by capturing latent correlations among search entities. Examples of such systems include chatbots and knowledge graph search (on the information retrieval side). In addition, graph searching may be leveraged to provide semantic summaries of information derived from graphs. By incorporating user's feedback, the graph searching can further increase the relevance of the search results in response to the query.

However, because of the network domain's highly interconnected topology, graph searching requires multi-hop searching to connect information from a node and subgraph queries. The exponentially increasing search costs on the extended hops within large knowledge graphs (i.e., of network assets) makes traditional pattern-matching based queries almost impossible. In addition, the pattern matching based queries can lead to large amounts of relevant search results due to both explicit and implicit network knowledge correlations, which significantly deteriorates the user's experiences in seeking solutions. In other cases (e.g., in network license feature procurement and/or recommendations for network security issues), users need multiple queries to convey a complicated network status or business scenario. The current graph search frameworks that focus on separately extracting matched subgraphs for graph search cannot orchestrate scattered knowledge into a well-formed solution.

The techniques presented herein provide a Generative Knowledge Search Engine (GSE) which uses Graph Generative Pre-Trained Transformers (G-GPT). The GSE transforms the knowledge graph search and completion tasks into a question-and-answer framework. By directly generating cohesive results, the GSE reduces the computational cost required by multi-hop graph search and avoids the overwhelming number of search results. Specifically, users' asset graph (e.g., devices, coverage, and telemetry data) is leveraged to contextualize the intention of the query as a customized schema. A graph completion module is employed to ensemble multi-queries graph search and output a single solution graph that reflects the user's real intention.

FIG. 1 is a block diagram of a system 10 that includes a generative knowledge search engine (the GSE 120) that interacts with an enterprise service cloud portal (cloud portal 100) and network/computing equipment and software 102 (1)-102(N) residing at various enterprise sites 110(1)-110(N) of an enterprise networks, or in a cloud deployment of an enterprise, according to an example embodiment.

The notations 1, 2, 3, . . . n; a, b, c . . . n; "a-n", "a-d", "a-f", "a-g", "a-k", "a-c", "a-p", "a-q", and the like illustrate that the number of elements can vary depending on a particular implementation and is not limited to the number of elements being depicted or described. Moreover, this is only examples of various components, and the number and types of components, functions, etc. may vary based on a particular deployment and use case scenario.

The system 10 is one example of an enterprise network. The system 10 may involve multiple enterprise networks.

The network/computing equipment and software 102(1)-102(N) are resources or assets of an enterprise (the terms "assets" and "resources" are used interchangeably herein). The network/computing equipment and software 102(1)-102 (N) may include any type of network devices or network nodes such as controllers, access points, gateways, switches, routers, hubs, bridges, gateways, modems, firewalls, intrusion protection devices/software, repeaters, servers, and so on. The network/computing equipment and software 102(1)-102(N) may further include endpoint or user devices such as a personal computer, laptop, tablet, and so on. The network/computing equipment and software 102(1)-102(N) may include virtual nodes such as virtual machines, containers, point of delivery (POD), and software such as system software (operating systems), firmware, security software such as firewalls, other software products and services. The network/computing equipment and software 102(1)-102(N) may be in a form of software products that reside in an enterprise network and/or in one or more cloud(s). Associated with the network/computing equipment and software 102(1)-102(N) is configuration data representing various configurations, such as enabled and disabled features. The network/computing equipment and software 102(1)-102(N), located at the enterprise sites 110(1) 110(N), represent IT environment of an enterprise.

The enterprise sites 110(1)-110(N) may be physical locations such as one or more data centers, facilities, or buildings located across geographic areas that designated to host the network/computing equipment and software 102(1)-102(N). The enterprise sites 110(1)-110(N) may further include one or more virtual data centers, which are a pool or a collection of cloud-based infrastructure resources specifically designed for enterprise needs, and/or for cloud-based service provider needs. Each enterprise site is a network domain, according to one example embodiment.

The network/computing equipment and software 102(1)-102(N) may send to the cloud portal 100, via telemetry techniques, data about their operational status and configurations so that the cloud portal 100 is continuously updated about the operational status, configurations, software versions, etc. of each instance of the network/computing equipment and software 102(1)-102(N) of an enterprise.

The cloud portal 100 is driven by human and digital intelligence that serves as a one-stop destination for equipment and software of an enterprise to access insights and expertise when needed and specific to a particular stage of an adoption lifecycle. Examples of capabilities include assets and coverage, cases (errors or issues to troubleshoot), automation workbench, insights with respect to various stages of an adoption lifecycle and action plans to progress to the next stage, etc. The cloud portal 100 helps the enterprise network technologies to progress along an adoption lifecycle based on adoption telemetry and enabled through contextual learning, support content, expert resources, and analytics and insights embedded in context of the enterprise's current/future guided adoption tasks.

A network technology is a computing-based service or a solution that solves an enterprise network or a computing problem or addresses a particular enterprise computing need. The network technology may be offered by a service provider to address aspects of IT. Some non-limiting examples of a network technology include access policies, security and firewall protection services, software image management, endpoint or user device protection, network segmentation and configuration, software defined network (SDN) management, data storage services, data backup services, data restoration services, voice over internet (VOIP) services, managing traffic flows, analytics services, licensing, etc. Some network technology solutions apply to virtual technologies or resources provided in a cloud or one or more data centers. The network technology solution implements a particular enterprise outcome and is often deployed on one or more of the network/computing equipment and software 102(1)-102(N).

An adoption of network technology solution refers to enterprise's uptake and utilization of a network technology for achieving a desired outcome. A journey refers to end-to-end activities performed by an enterprise when adopting a network technology including tasks they perform and defined stages to progress. An adoption lifecycle refers to a step-by-step guidance along the adoption journey to accelerate the speed to value of a network technology. The adoption lifecycle may encompass the end-to-end journey stages of: need, evaluate, select, align, purchase, onboard, implement, use, engage, adopt, optimize, recommend, advocate, accelerate, upgrade, renew, etc.

As noted above, various IT specialists (users) interact with the cloud portal 100 to manage network devices and software of the enterprise. There are many factors for a user to consider when building, operating, and maintaining enterprise network(s) and/or data center(s).

For example, an enterprise network may include dispersed and redundant sites such as the enterprise sites 110(1)-110(N) to support highly available services (e.g., network at various geographic locations). These enterprise sites 110(1)-110(N) include network/computing equipment and software 102(1)-102(N), which may be different hardware and software that host network services needed for the enterprise services (e.g., product families, asset groups). Different types of equipment run different features and configurations to enable the enterprise services.

Moreover, each device or group of devices may encounter various issues. In one example embodiment, these issues involve network related problems or potential problems. Network related problems may involve an outage, a latency problem, a connectivity problem, a malfunction of the network device or software thereon, and/or incompatibility or configuration related problems. In one example embodiment, issues may involve defects, obsolescence, configurations, workarounds, network patches, network information, etc. Issues may relate to warranties, licenses, security alerts, or may be informational notices e.g., for a particular configuration or upgrade.

Network related issues are typically provided in a form of notifications. Notifications are advisories, reports, field notices, alerts, posts, etc. from various vendors and other sources. The notifications may be provided via email, an Internet post, and/or directly provided to enterprise network via a subscription service, for example. The notifications may be documents, files, etc. Notifications include data such as text, links, etc. For example, a notification may be a document that covers one or more defects detected in affected network devices or software (e.g., a network service). A notification may be an internet post that describes a security related issue and how to reconfigure the network device to mitigate a detected security vulnerability. A notification may be an email that describes best practices and preferred configurations for a network asset such as the network device. A notification may be a product guide (a pdf file) that describes general conditions that could adversely affect an enterprise network or one or more of its assets (network devices and/or network services). These are some non-limiting examples of various notifications encountered by an enterprise network. These notifications may be obtained by searching a knowledge base. Keyword searching may yield search results with irrelevant information/notifications and may omit some notifications that should have been included.

The GSE 120 provides an end-to-end solution-based search results. The GSE 120 deploys pre-trained graph transformers to build an end-to-end solution-driven graph search engine using deep learning models on top of a network knowledge base. Instead of pattern-match based graph queries such as keyword searching, the GSE 120 directly generates completed graph solutions for the inquiries. The graph solutions yield search results that are specific to the enterprise network and are in response to the intention of the search query.

The GSE 120 employs a relational emphasized graph knowledge. Through the task-agnostic pre-training on network topology data from the cloud portal 100, the graph model learns the most intrinsic of the latent correlations and reflects the strong-to-weak relations among different concepts and solutions. The outcomes of the graph model correspond to relational emphasized graph knowledge.

The GSE 120 provides for deep customization. Unlike memorizing the enterprise's query history data, the GSE 120 directly utilizes the enterprise's asset data (inventory data) to contextualize the queries into multiple query graphs. By employing the enterprise's network portfolio obtained from the cloud portal 100, the contextualized query graphs embed the user's intention to achieve deep customization. The GSE 120 is applicable in multiple downstream tasks related to the knowledge graph completion.

For example, in product, feature, or license searching, the GSE 120 predicts the most relevant products and license features that fit into the current asset portfolios of an enterprise. A user may input a search query "switch xxx". The GSE 120 contextualizes the search query to the enterprise inventory data e.g., switch xxx_1 and switch xxx_2 (excluding switch xxx_3, which is not party of the enterprise assets) but may include switch yyy that are connected to the switch xxx in the enterprise network. The GSE 120 further contextualizes the search query based on the user persona i.e., IT network specialist. Based on the foregoing, the GSE 120 searches the knowledge base to output search results that include latent correlations e.g., between the switch xxx and switch yyy in the enterprise network. Further, the search results may be a direct response that includes: a list of switches in the enterprise network that should be upgraded (and may include recommendations for switch yyy that is directly affected), what software upgrades should be performed, what switches needed to be replaced with new switches zzz, and/or potential issues or problems if the upgrades and/or replacements are not completed. The user may further be provided with links to the sources used to generate the direct response. The GSE 120 thus generates a solution-based response that reflects the user's intent.

As another example, the GSE 120 generates solution-recommendations for security issues that are specific to the enterprise network. When a network security issue is detected and identified, the critical situation, the network-related configurations, and the enterprise's security related history data are contextualized into a unique query schema. The GSE 120 then generates highly correlated solution graphs that target specific network settings. That is, the specific network settings are tailored based on the enterprise network, the enterprise sites 110(1)-110(N), and/or the network/computing equipment and software 102(1)-102(N).

The solution-recommendations may involve one or more actions to be performed by the GSE 120 or by the cloud portal 100 with the GSE 120 such as changing a configuration of a particular network device(s), updating software asset(s) to a newer version, etc. The user is then notified that these automated actions were performed. The GSE 120 may generate search results for performing the same action(s) on a group of devices (e.g. that run a particular service of the enterprise or use a particular network enterprise service) such as automatically installing the same security patch for a first network/computing equipment and software 102(1) and a second network/computing equipment 102(N), where the first network/computing equipment and software 102(1) and the second network/computing equipment and software 102(N) are similarly functioning devices located at different enterprise sites.

While one or more example embodiments describe the GSE 120 with respect to the cloud portal 100, this is just an example. Actionable tasks may involve other services and/or systems. In other words, actionable tasks may or may not involve the cloud portal 100. In one example embodiment, actionable tasks may include a first action that involves a network management platform for a first enterprise site 110(1) and a second action that involves a network controller of the network domain, and a third action that involves a direct connection to one of the network/computing equipment and software 102(1)-(N) at a second enterprise site 110(N). Actionable tasks may include actions that are performed in multiple management platforms and the like.

Figure 2:
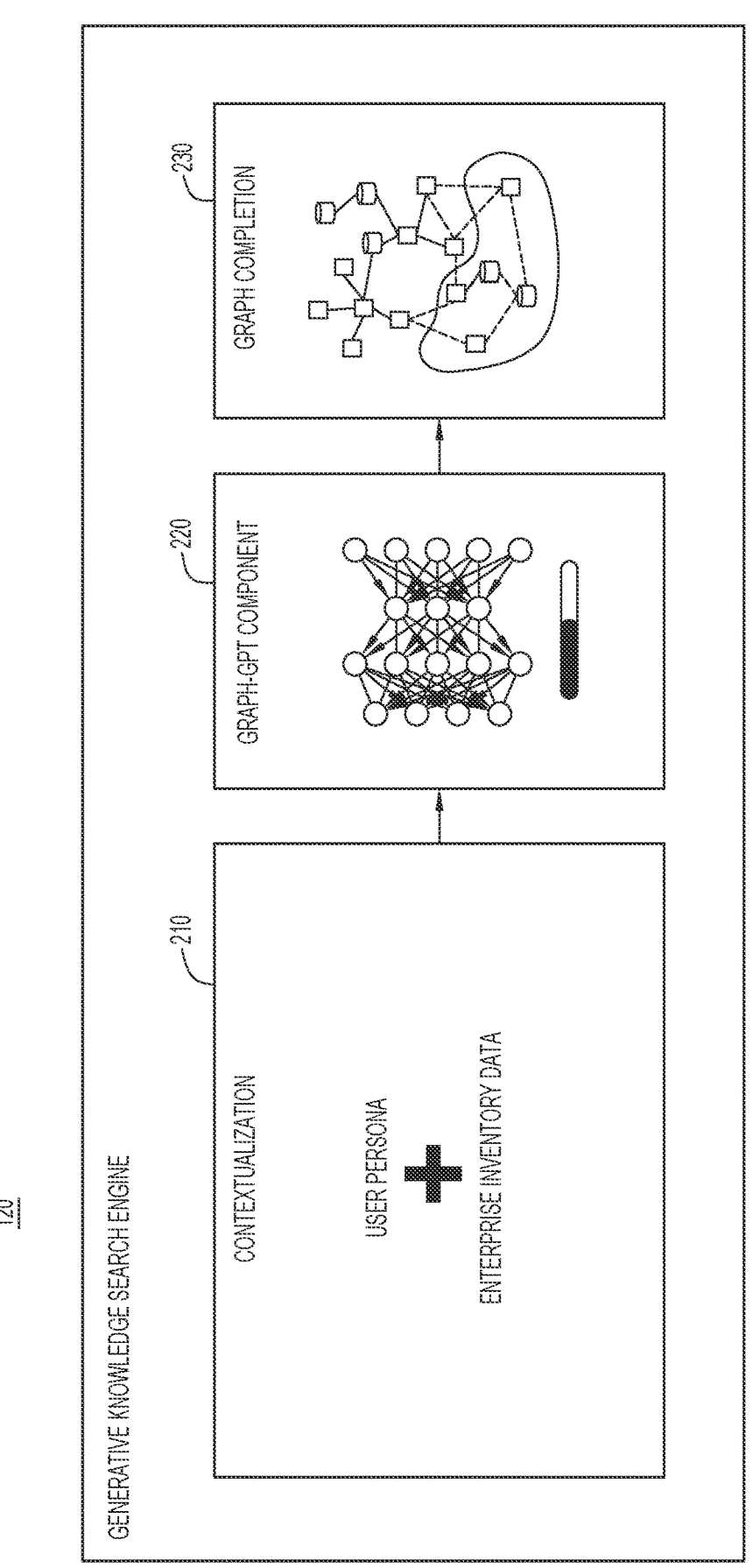
FIG. 2 is a diagram illustrating components of the GSE that uses pre-trained graph transformers to generate an enterprise network specific response for a query or multi-query search inquiry, according to an example embodiment.

FIG. 2 is a diagram illustrating components of the GSE 120 that uses pre-trained graph transformers to generate an enterprise network specific response for a query or multi-query search inquiry, according to an example embodiment. The GSE 120 includes a contextualization component 210, a graph GPT component 220, and a graph completion component 230.

The contextualization component 210 generates contextualized schema for searching based on the input search query. In a keyword-query-based search engine, when a user submits query terms, without contextualization or prior-based restrictions, the search engine outputs all subgraphs that contain the query terms from the global knowledge graph. Some mapping subgraphs may not fit the enterprise's specific needs. For example, a small information service company typically shows no interest in the solutions or recommendations for sophisticated security features designed for large-size companies. Besides, the fully expanded search results could be overwhelming or time-consuming to navigate.

In contrast, the contextualization component 210 transforms the input queries into multiple query sub-graphs. The enterprise inventory data (enterprise asset portfolio) is employed to contextualize the search terms (i.e., nodes). All the potential relations/hypotheses (i.e., meta path) in the asset graph that are directly or indirectly connected to the search nodes are masked (e.g., two candidate "query graphs"). These masked subgraphs represent various hypotheses.

Additionally, by traveling through all possible paths to connect the inquiry nodes, the generated query graphs are customized within the framework of the existing assets portfolio (enterprise inventory data). In this way, the search input is contextualized and as a result, the general keyword-based whole space search is pruned by limiting the scope of the search by avoiding a non-correlated search. Moreover, the generated query sub-graphs are search nodes that are expanded to include latent correlations based on the inventory data.

Further, user persona i.e., user's role within the enterprise network may be used to generate the contextualized schema for searching the knowledge base. Based on user's persona, the contextualized schema is pruned and/or expanded to capture user's intent.

User persona is a user identity within an enterprise network. User personas may include, by way of an example, a plurality of personas such as a network security specialist, license or asset management, a network operator, a network administrator, a decider who purchases upgrades, equipment, etc., a researcher, a planner, a network engineer, an IT solution specialist, or a developer. For example, a network operator may focus on asset management such as status and performance of the network equipment and software 102(1)-102(N) of FIG. 1, whereas a network planner may focus on an overall performance of the enterprise network (whether the enterprise has enough resources/assets to meet the requirements, etc.). The generated query sub-graphs are pruned and/or expanded based on the user persona.

In determining user persona, various daily tasks performed by the user may be considered because the same user persona may perform different tasks within different enterprises. The same persona may have different daily tasks depending on the type, size, and job segmentation of their enterprise. For example, the operator may have a network role that focuses on hardware assets of the enterprise or may have a security role that focuses on operating system versions of the enterprise assets. Since different user identities in different enterprises result in different daily tasks, the user persona needs to consider the daily tasks within the enterprise network performed by the user to accurately capture user's intent in the contextualized schema.

As noted above, the contextual schema includes a plurality of query sub-graphs indicative of the intention of the at least one search query, which may be a multi-query search inquiry. A multi-query search inquiry includes a plurality of search queries that are input by a user for one search. By way of an example, a multi-query search inquiry input by a user may include what are the router's security vulnerabilities, available patches and updates, possible issues with the updates and/or patches. The contextualization component 210 generates a plurality of search nodes based on these queries of the multi-query search inquiry and determines one or more correlations between the plurality of search nodes based on the inventory data, and then generates a plurality of query sub-graphs, each indicative of the one or more correlations between the plurality of search nodes and each specifically tailored to the inventory data and user persona. For example, the contextualized schema would include only routers xxx (present in the inventory data), upgrades for the router xxx and may be for the router yyy (if it too needs to be upgraded), and may be a search for prices of the upgrades depending on the user's persona (e.g., for the planner), etc.

The graph GPT component 220 generates predicted graphs by training the query graphs 216a-k using a plurality of graph generative pre-trained transformers. In the graph GPT component 220, a task-agnostic pre-training framework for graph learning is leveraged. Without curating the graph data to cater to different task-oriented objective functions, the graph GPT component 220 employs a training recipe of multi-task language-model to learn the representation of the network knowledge graph. By feeding the query graphs 216a-k from the contextualization component 210, the graph GPT component 220 generates completed knowledge graphs that include, for instance, predicted missing network features, alternative devices, and overlapping license bundles.

The graph completion component 230 generates a solution graph for providing search results that are aligned to the intentions of the search inquiry. In the graph completion component 230, the generated subgraphs are pruned and merged into a single solution graph. Specifically, the graph completion component 230 is beyond the knowledge graph completion tasks but selectively recommends a potential solution in response to the query or multi-queries search inquiry.

For example, when an enterprise submits a multi-query search inquiry to determine how to purchase new product/license bundles, etc., the multiple generated subgraphs represent strategies from different perspectives such as sub-graphs that focus on enhanced features and other subgraphs that center on capacity. The graph completion component 230 merges these subgraphs and retains the most shared graph pattern as the prioritized recommendation that involves suggested products, services, licenses, configuration changes, etc.

Figure 3:
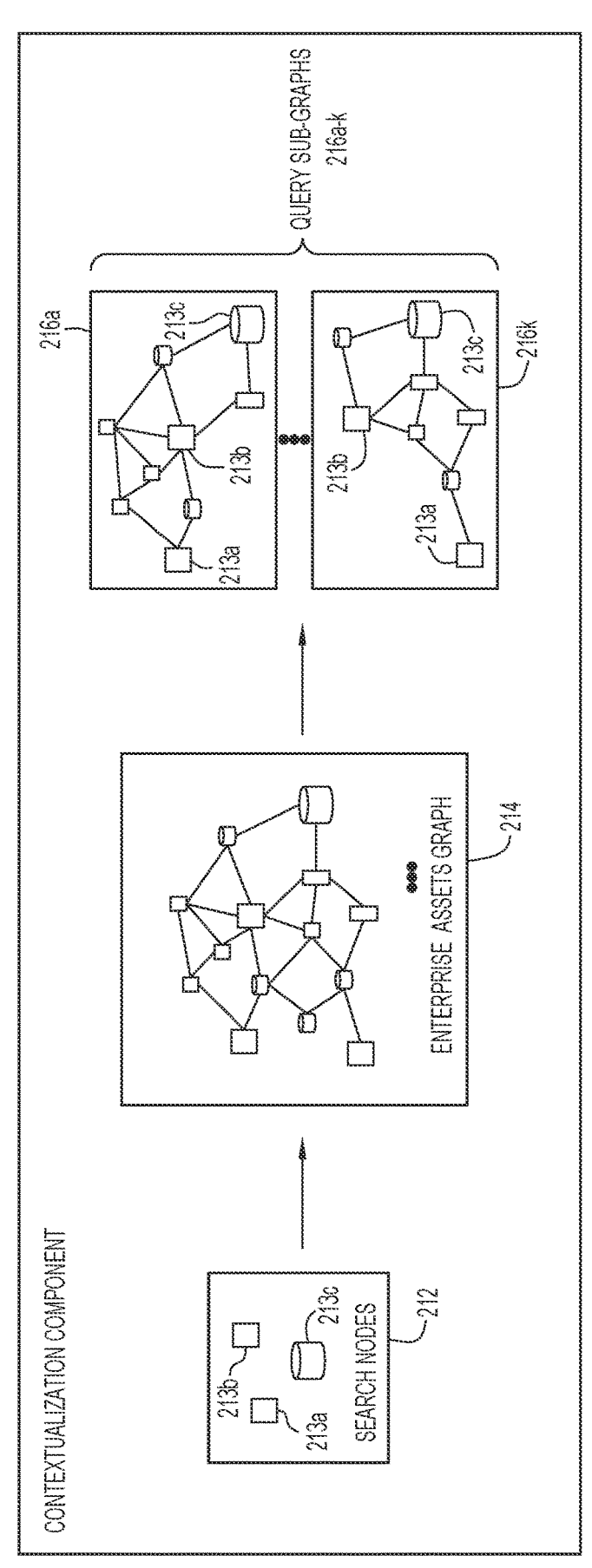
FIG. 3 is a diagram illustrating a contextualization component of the GSE that contextualizes a search inquiry into a contextualized schema specific to an enterprise network, according to an example embodiment.

FIG. 3 is a diagram illustrating modules of a contextualization component 210 of FIG. 2 that contextualizes a search inquiry into a contextualized schema specific to an enterprise network, according to an example embodiment. The contextualization component 210 includes search nodes 212, an enterprise asset graph 214, and a plurality of query sub-graphs 216a-k.

The contextualization component 210 transforms input query or multi query search inquiry into the plurality of query sub-graphs 216a-k based on inventory data of the enterprise and/or user persona. Specifically, the search inquiry is transformed into search nodes 212. The search nodes 212 may include a first search node 213a, a second search node 213b, and a third search node 213c. Each search node corresponds to one query of a multi-query search inquiry or to various parts of the input query search inquiry. For example, when a user submits multiple queries, device stock keeping numbers (SKUs) are transformed into the first search node 213a, the license features are transformed into the second search node 213b, and the network traffic loads are transformed into the third search node 213c.

The enterprise asset graph 214 is then applied to the search nodes 212 to generate the query sub-graphs 216a-k. That is, the inventory data (enterprise asset portfolio) is transformed into the enterprise asset graph 214 in which relationships and/or correlations (meta paths) between various nodes (e.g., enterprise assets, configurations, etc.) are captured. All the potential relations/hypotheses (i.e., meta path) in the enterprise asset graph 214 that are directly or indirectly connected to the search nodes are masked to generate the query sub-graphs 216a-k. These masked sub-graphs represent various hypotheses.

Additionally, by traveling through all possible paths in the enterprise asset graph 214 to connect the search nodes 212, the query sub-graphs 216a-k being generated are customized within the framework of the existing assets portfolio (inventory data of the enterprise). In this way, the search input is contextualized and as a result, the general keyword-based whole space search is pruned by limiting the scope of the search by avoiding a non-correlated search.

The query sub-graphs 216a-k are one example of a contextualized schema that reflects user's intent and is specific to the inventory data of the enterprise. The query sub-graphs 216a-k may include a first candidate query sub-graph 216a and a second candidate query sub-graph 216k, each of which include not only the search nodes 212 but also various relationships or correlations including other nodes (meta paths) based on the enterprise asset graph 214 i.e., determined using the enterprise asset graph 214.

The query sub-graphs 216a-k are then fed into the graph GPT component 220.

Figure 4:
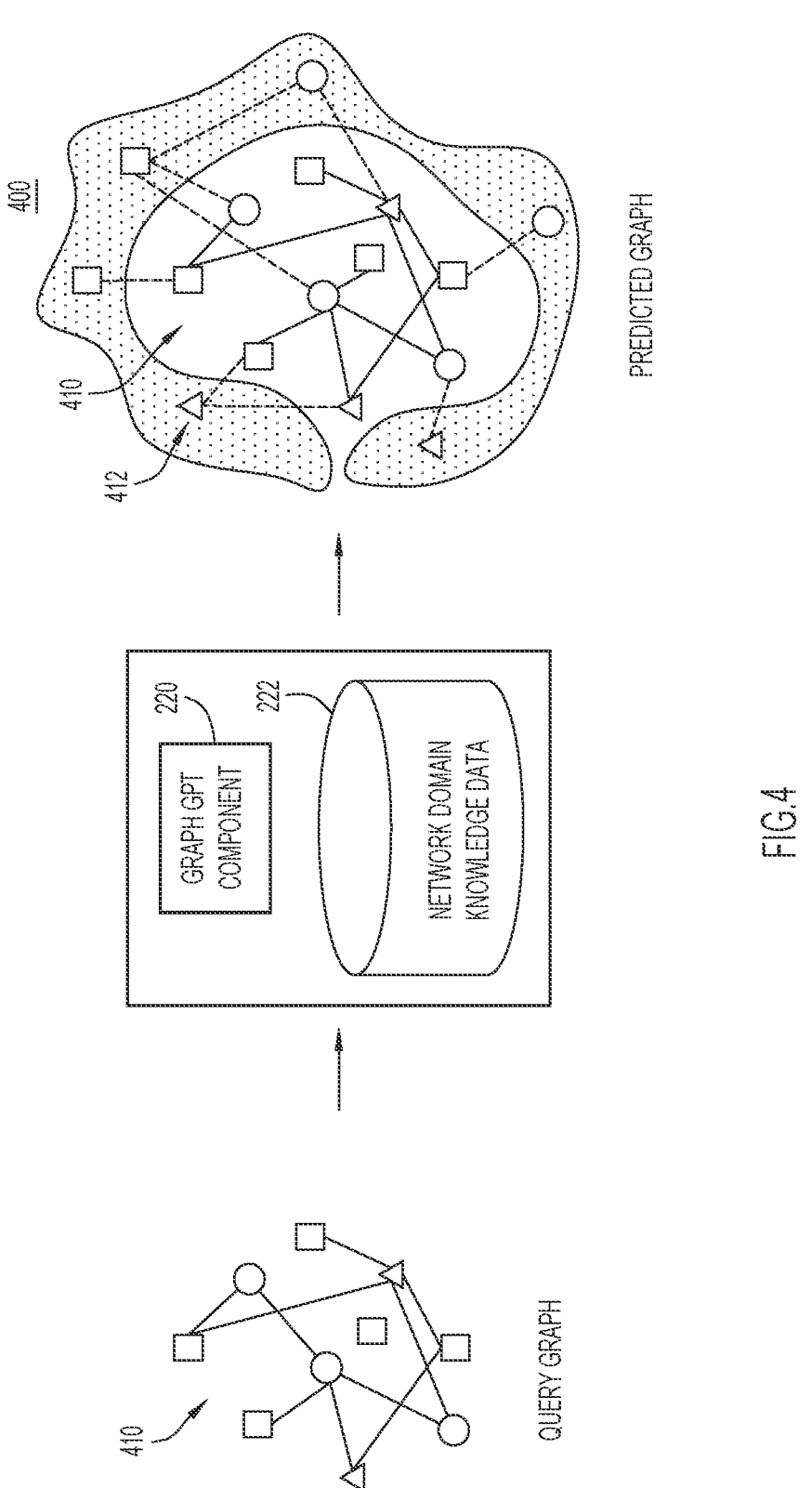
FIG. 4 is a diagram illustrating an expanded predicted graph generated by a graph generative pre-trained transformers (G-GPT) based on a respective query graph, according to an example embodiment.

FIG. 4 is a diagram illustrating an expanded predicted graph 400 generated by a graph generative pre-trained transformers (the graph GPT component 220 of FIG. 2) based on a respective query graph 410 (one of the query sub-graphs 216a-k of FIG. 2) and a network domain knowledge data 222, according to an example embodiment.

The graph GPT component 220 (G-GPT) leverages unsupervised pre-trained machine learning to generate a knowledge graph representation framework. The graph GPT component 220 uses multi-layer transformers to learn the intrinsic topology correlations, hypotheses, and/or relationships that are applied to various graph completion tasks.

Analogous to the unsupervised language model that predicts the next token based on previous input sequences within the context window, the graph GPT component 220 generates one-hop-size nodes for all the leaf nodes on the graph. Accordingly, the training objective is to maximize the likelihood for all the one-hop nodes conditioned on the input subgraph i.e., the respective query graph 410. In this way, the pre-training framework is implemented on heterogenous graph data without adapting the training data to fitting into different downstream tasks. The extra one-hop prediction embeds the context information and as a multi-task learner, the training objective reflects the high-dimension graph universal prediction.

The network domain knowledge data 222 may include a global knowledge base with data from various data sources. In case of network security related issues, the network domain knowledge data 222 may include enterprise internal alerts, vulnerabilities, bug reports but it may further include external information such as publicly posted security alerts, security vulnerabilities, or any other notifications. The network domain knowledge data 222 is a data set being search and is not limited to a particular database or knowledge base. The network domain knowledge data 222 will depend on a particular deployment and use case scenario. The network domain knowledge data 222 is utilized for training the graph GPT component 220. The network domain knowledge data 222 is not explicitly used during the prediction phase. The training data for graph GPT component 220 are subsets of network domain knowledge data 222.

As shown at 412, the shaded connections/nodes refer to the predicted one-hop graph. In other words, the expanded predicted graph 400 includes additional nodes not present in the respective query graph 410. In one example embodiment, the graph GPT component 220 uses all previous tokens to predict the masked tokens, thus learning correlations and/or relationships between various nodes. The graph GPT component 220 uses the trained GGPT model (that was trained using the network domain knowledge data 222 to train this deep neural network based model, in other words, the trained GGPT model represent the network knowledge implicitly) to predict the next-hop nodes for the expanded predicted graph 400.

Figure 5:
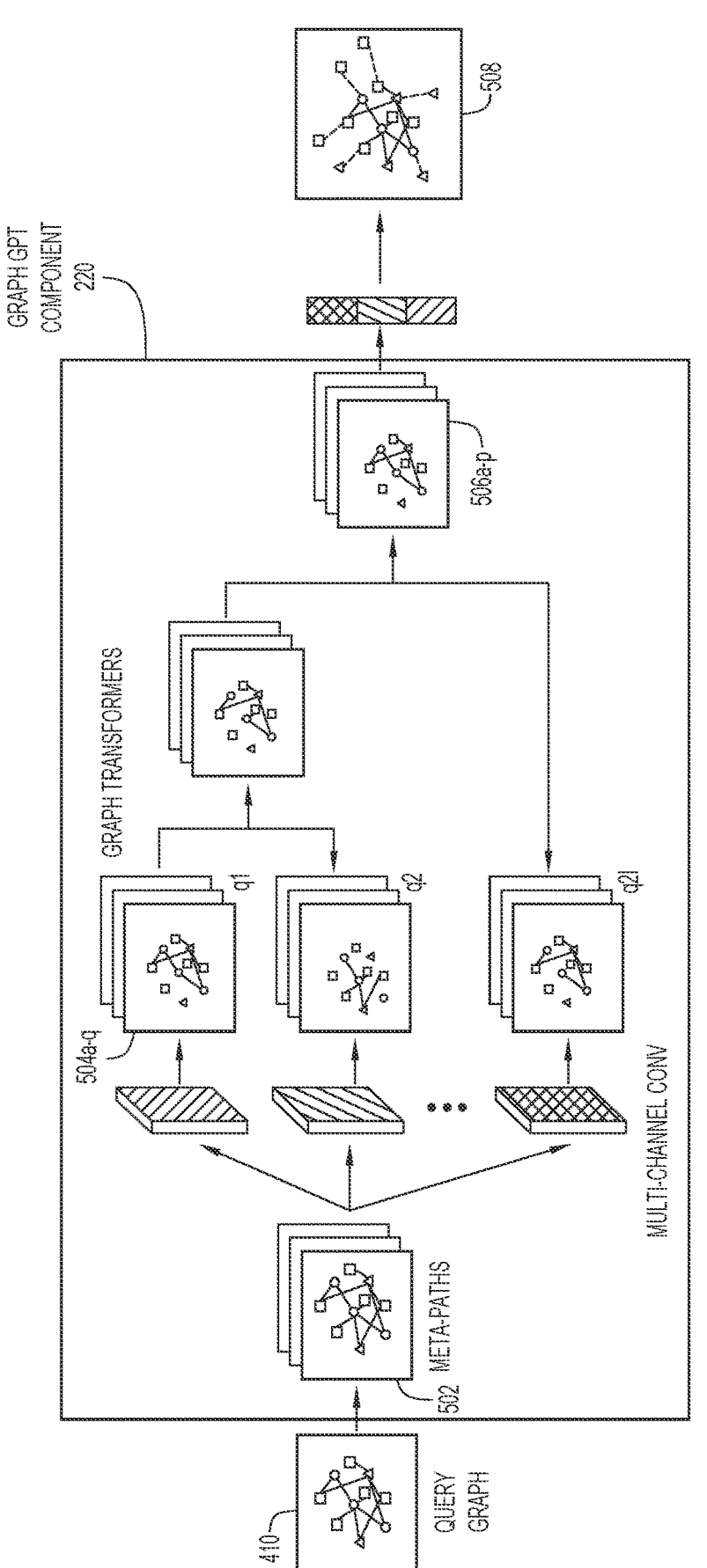
FIG. 5 is a diagram illustrating components of a graph generative pre-trained transformers (G-GPT) component of the GSE that performs unsupervised machine learning to generate multiple prediction sub-graphs having reconstructed meta-paths with expanded structures, according to an example embodiment.
Figure 6:
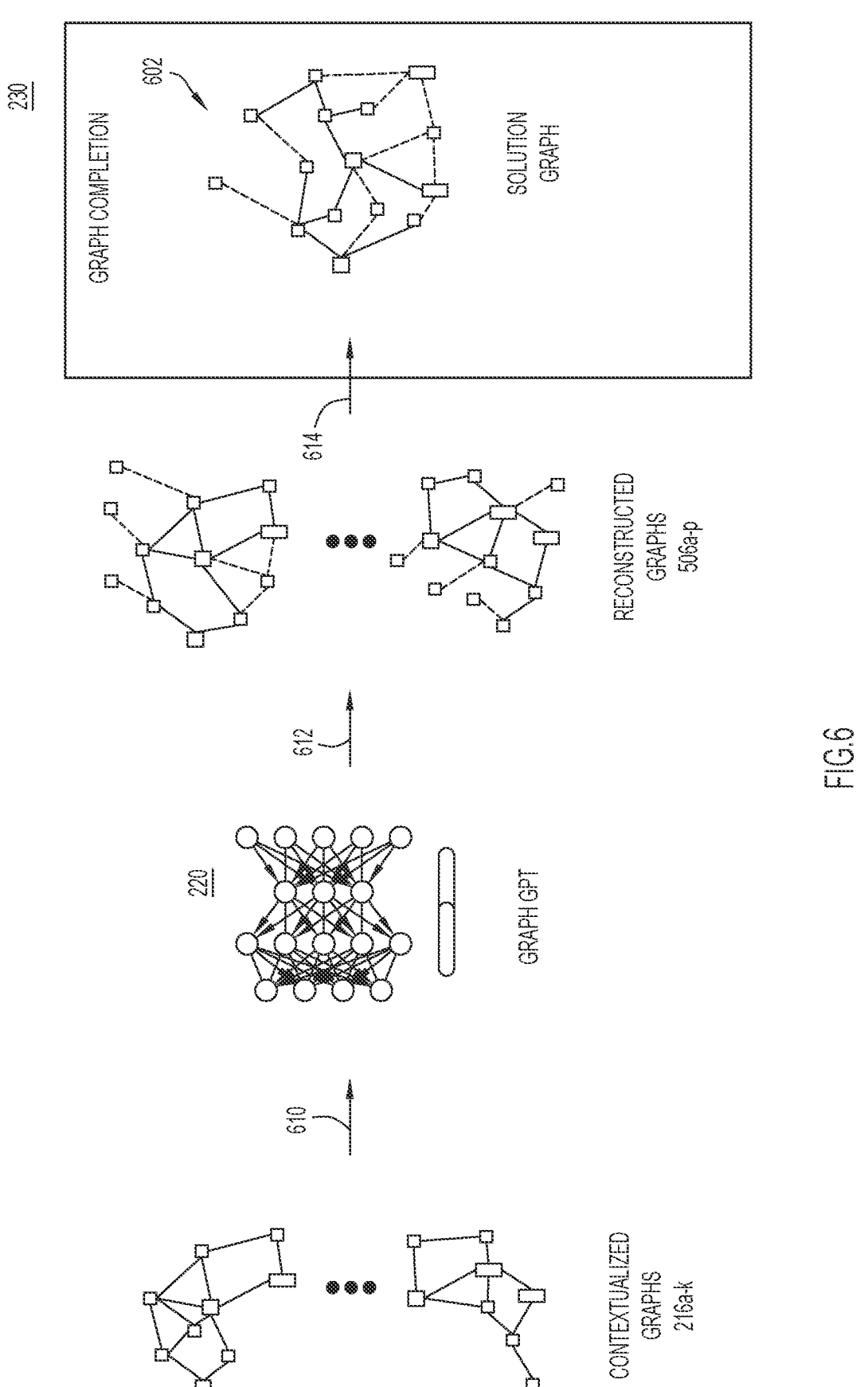
FIG. 6 is a flow diagram illustrating a graph completion component of the GSE performing common hypotheses learning-based graph completion to expand multiple prediction sub-graphs with a global knowledge graph, according to an example embodiment.
Figure 7:
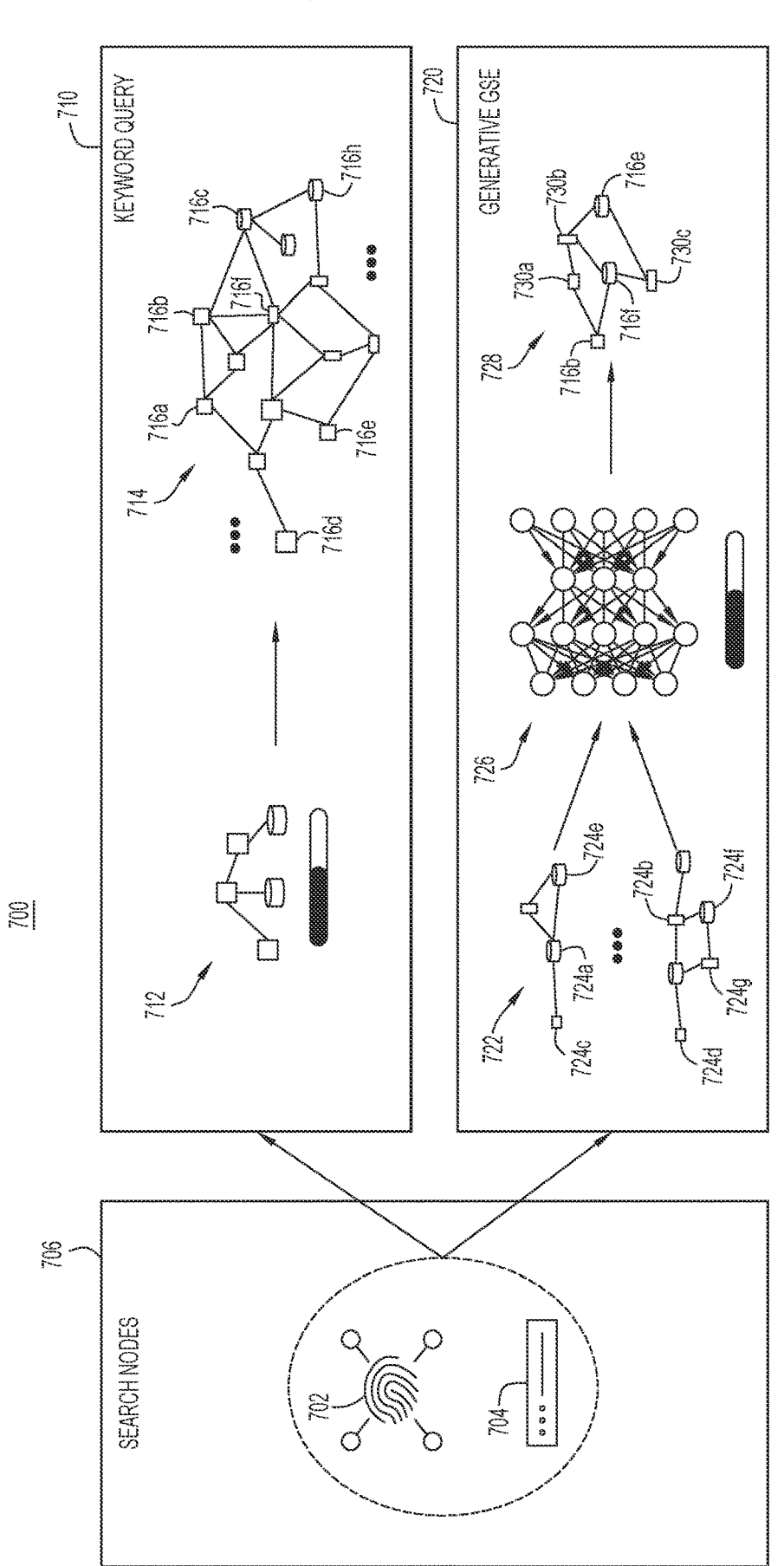
FIG. 7 is a comparative diagram illustrating generated heterogeneous graphs based on keyword query-based graph search and based on the leveraged generative graph search engine with contextualization and meta-path merging according to an example embodiment.

With continued reference to FIG. 4, FIG. 5 is a diagram illustrating modules of the graph GPT component 220 that performs unsupervised machine learning to generate multiple prediction graphs having reconstructed meta-paths with expanded structures, according to an example embodiment. The graph GPT component 220 obtains each respective query graph 410 as input for learning meta-paths 502. The meta-paths 502 extracted from the respective query graph 410 are input into multi-layer transformers 504*a-q* to generate reconstruction graphs 506*a-p* (which are then merged into a solution graph 508 by the graph completion component 230 of FIG. 2).

The graph GPT component 220 uses multi-layer transformers 504*a-q* to automatically decompose the respective query graph 410 to search through the meta-paths 502 therein in the network domain knowledge data 222. In contrast with the general meta-learning setting that needs to curate the training graph data to fit each downstream task, the graph GPT component 220 leverages multiplication with kernel matrix to learn multi-scale subgraphs. In this way, the graph GPT component 220 generalizes the training objective for subgraph learning.

Compared with other subgraph masking techniques that need to traverse the meta path based on all the hypotheses, the graph GPT component 220 uses generative transformer-based graph learning that utilizes attention module to automatically learn the patterns of subgraphs with focusing on the most significant nodes/connections.

In addition, to implement a large-scale unsupervised pre-training framework on knowledge graphs, the node-based k-hop-size learning does not guarantee a multi-task learner. In contrast, the subgraphs (e.g., the respective query graph 410) input into the graph GPT component 220 are formalized as meta-paths 502 for the respective query graph 410, in which various hypotheses are included. Through those numerous subgraphs (the meta-paths 502), the long-range semantic correlations existing in the global graph (i.e., the network domain knowledge data 222) are captured by the graph GPT component 220. With feeding into a large amount of the meta-path subgraphs, the multi-layer transformers 504*a-q* are the multitask learner as the language GPT.

The multi-layer transformers 504*a-q* may involve convolutional neural networks, graph neural networks, unsupervised machine learning, and/or attention module. In one example embodiment, the multi-layer transformers 504*a-q* implement a multi-channel meta-path graph convolutions.

In one example embodiment, the respective query graph 410 is a customized query graph to which meta-paths 502 are applied that represent various relational hypotheses, according to an example embodiment. Graph generative pretrained transformers (i.e., multi-layer transformers 504*a-q*) learn correlations between nodes using masking and generate the reconstruction graphs 506*a-p*. The reconstruction graphs 506*a-p* are based on a customized query graph that includes multiple meta-paths to represent various relationship hypotheses. The reconstruction graphs 506*a-p* are reconstructed meta-paths with an expanded structure. The generative approach may be somewhat comparable with the language GPT model. The reconstruction graphs 506*a-p* are then merged to generate the solution graph 508.

Specifically, with continued reference to FIGS. 2-5, FIG. 6 is a flow diagram illustrating the graph completion component 230 of FIG. 2 performing common hypotheses learning-based graph completion to expand multiple prediction sub-graphs with a global knowledge graph, according to an example embodiment.

Specifically, at 610, the graph GPT component 220 obtains contextualized schema specific to the enterprise and the user that input the search query. The contextualized schema includes one or more contextualized graphs i.e., the query graphs 216*a-k* of FIG. 2.

At 612, the graph GPT component 220 generates multiple subgraphs (reconstruction graphs 506*a-p*) based on the contextualized schema i.e., the input contextualized graphs (the query graphs 216*a-k* of FIG. 2). However, reconstruction graphs 506*a-p* may include pre-assumed perspectives or hypothesis. To further refine the common patterns from the reconstruction graphs 506*a-p*, at 614, a hypothesis merging approach is employed in the graph completion component 230.

Specifically, the graph completion component 230 introduces a global knowledge graph, and the contextualized subgraphs (reconstruction graphs 506*a-p*) are further expanded with the relevant peers. The graph completion component 230 performs hypothesis learning-based graph completion. That is, the network domain knowledge data 222 may equal to the global knowledge graph (i.e., the network domain knowledge may include entities, documents, tabular, etc.). The global knowledge graph is the graph representation of the knowledge. In the training phase, subgraphs are extracted from the global knowledge graph to train the graph GPT component 220.

Since the graph GPT component 220 reconstructs the graph with the k-hop prediction (e.g., one-hop expansion), the graph completion component 230 incorporate the globalized information on top of the localized model. In this way, by extending the connections, the generated graphs potentially expand to a larger knowledge space while not deviating from the focus controlled by the contextualization.

However, in the reconstructed graphs 506*a-p*, the hypotheses in each meta-path may include some non-overlapping relationships. To further refine the hypothesis in the final recommended solution (the solution graph 602), graph merging is leveraged to eliminate the low probability connections and to extract the common patterns shared across multiple subgraphs (the reconstructed graphs 506*a-p*). By maintaining the minimal footage of the subgraph patterns, the merged mask that reflects the uniform hypothesis is obtained as the solution graph 602.

The graph reconstruction performs generative graph reconstruction and common hypotheses merging. Specifically, generative graph reconstruction involves morphing the global knowledge. That is, the graph GPT component 220 predicts one-hop extension for each leaf node on the input graph using the network domain knowledge data 222. During the graph extension prediction, the original input graph is morphed by incorporating the global knowledge graph (i.e., the network domain knowledge data 222). By combining the customized subgraph with the global knowledge, the reconstructed knowledge graph presents the most desirable solution(s) specifically tailored to the enterprise.

In the graph completion component 230, the common hypotheses merging is performed and involves extracting commonly shared patterns across the reconstructed knowl- edge graphs (the reconstructed graphs 506a-p). Since the input query graphs include multiple hypotheses derived from the enterprise's asset graph (inventory data), each single query graph corresponds to one completed output graph. However, to guarantee an end-to-end solution rec- ommendation, a merging operation, performed by the graph completion component 230, extracts the commonly shared pattern across all the reconstructed graphs 506a-p. In one example embodiment, deep machine learning may be applied to merge the reconstructed graphs 506a-p.

The solution graph 602 generated by the graph comple- tion component 230 provides an end-to-end solution to each question in a multi-query search inquiry. The solution graph 602 may involve one or more auto configuration actions in which various enterprise devices are reconfigured (e.g., updates are installed). The solution graph 602 may further involve one or more network solution recommendations or insights that identify one or more enterprise assets, sug- gested network related configurations for the enterprise network, and possible network issues that may result if the suggested network related configurations are not imple- mented.

The solution graph 602 may reflect latent correlations in the inventory data that are typically omitted by the tradi- tional search engines. Moreover, the solution graph 602 may provide an end-to-end solution such as a direct response with the affected network devices of the enterprise, actions to be taken, and how to take these actions and/or it may implement various actions on the user's behalf and notify the user of the same. Unlike the traditional search engines that provide various links or vast among of search results, the GSE 120 provides a direct response with a specific solution(s) based on the solution graph 602. Moreover, the solution graph 602 is tailored to the enterprise and user persona i.e., it is specific to user's intent and enterprise inventory data.

With continued reference to FIGS. 1-6, FIG. 7 is a comparative diagram 700 illustrating generated heteroge- neous graphs based on keyword query-based graph search and based on the leveraged generative graph search engine (e.g., the GSE 120) with contextualization and meta-path merging according to an example embodiment. The com- parative diagram 700 involves search nodes 706 which serve as input into a keyword query searching 710 and a genera- tive GSE searching 720.

Modern network assets portfolios management requires adapting to the ever-changing enterprise needs. Product/ License features as the foundation of the hardware/software infrastructure directly impact the capability of the network assets. Therefore, bridging the knowledge gap between license features and products would facilitate the enter- prises' business scaling.

In related art, designated experts guide users through building their product/license feature portfolios. However, users frequently come across a situation where they have difficulty catching up with the latest license features and/or products-related license features due to the high-rising domain knowledge bar. Network knowledge searching can be effective in obtaining an understanding of the values brought by the product/license features and in finding the latest product/license features and product evolvements to support the enterprise needs.

For example, enterprise A may have a particular interest in security services feature 702 on the network switch series A (a switch 704). As such, a search query is formulated that includes search nodes 706 such as a multi-search inquiry that involve new security services for networks and security services for switches.

In the keyword query searching 710, content applicable to security services feature 702 is obtained i.e., keyword search 712 is performed. Without contextualization and due to the very large knowledge graph of networking portfolio (e.g., the security services product family includes Essential, Advantage, Premier derivatives, and multiple security fea- tures shared across various hardware/devices), a keyword query retrieves all security services related knowledge trees as the query output 714. The query output 714 includes services and assets 716a-h that may be unrelated to the enterprise network but are obtained from a global knowl- edge base e.g., the network domain knowledge data 222. For example, the query output 714 may include management applications 716a related to the switch 704 and it may include security applications 716b that are applicable to network switch series B, a security alert 716c for network switch series B, various other notifications such as 716d, 716e, 716f, and 716h.

On the other hand, in the generative GSE searching 720, at 722, the search nodes 706 are contextualized with the enterprise's asset graph and security features used by the enterprise previously, and optionally user persona. For example, the enterprise used authentication, authorization, and accounting features (AAA 724a) and master data man- agement features (MDM 724b). As such, the AAA 724a and the MDM 724b are added as additional search nodes during the contextualization i.e., generation of the contextual schema. That is, at 722, the contextual schema is generated and includes a plurality of query sub-graphs 724a-g (e.g., a networking feature 724c, a first licensing feature 724d, a second licensing feature 724e, a first configuration feature 724f, and a second configuration feature 724g).

At 726, after consuming all the hypothesized subgraphs (the query sub-graphs 724a-g), the GSE 120 generates the expanded solution graph 728 by merging the common patterns shared across all the contextualized query graphs i.e., the query graphs 724a-g. That is, the GSE 120 applies graph generative pre-trained transformers to meta-paths of the query sub-graphs 724a-g to learn various relationships and expand the graph using the network domain knowledge data 222, generating predictive graphs, which are then merged into the expanded solution graph 728 based on common patterns, etc.

Unlike the query output 714 of the keyword query search- ing 710, the expanded solution graph 728 of the generative GSE searching 720 (with contextualization and meta-path merging) is more specific to the enterprise network and the intent of the query. Specifically, after inputting all the contextualized query graphs 724a-g into generative GSE (i.e., the graph GPT component 220 and the graph comple- tion component 230), the reconstructed subgraphs add extended relevant features to the expanded solution graph 728. By applying the generative GSE, the management applications 716a and the feature 716d have been removed from the expanded solution graph 728 since the enterprise historical device activities do not involve these cloud ser- vices. Alternatively, or in addition, a security appliance 730a, a first network device 730b, and a network switch type C (the switch 730c) appear in the expanded solution graph 728, which suggests a potential update in terms of the device. The expanded solution graph 728 is specific to the enterprise network and provides an end-to-end solution.

With continued reference to FIGS. 1-6, FIG. 8 is a diagram illustrating a security issue graph 800 that involves multiple security vulnerabilities 802*a-r* based on different problems in an enterprise network, according to an example embodiment. The security issue graph 800 involves a network device Y 810 such as a network switch, router, access point, etc., and security issues 820 such as multiple security vulnerabilities 802*a-r*, and critical security bugs 822*a-b*.

In another use case scenario, the GSE 120 is deployed for a security solution graph searching. A use case for the GSE 120 involves accurately locating solutions for security issues in an enterprise network. It is often the case that a device may be affected by multiple vulnerabilities and a traditional keyword-based search engine views each of these vulnerabilities as a separate entity. The network operator, for example, is advised to solve security issues in a step-by-step procedure. For a single device, giving the recommendations of multiple actions in different steps results in a lower chance of the network operator implementing remediation tasks needed to reduce the risk.

Comparatively, the GSE 120 focuses on extracting the topology/correlations from the knowledge graph, and the contextualization further helps to refine the search scope. The end-to-end Graph GPT directly learns the dependency and relationships among the security graphs/issues, which contributes to accurately and efficiently locating the solutions for the security problems.

For example, the network device Y 810 is running into security issues 820. In the enterprise network, the network device Y 810 has critical security issues noted in the first bug report 822*a* and the second bug report 822*b*, and the security vulnerabilities 802*a-r*.

A vulnerability may be caused by several factors exposed by hardware, software, and end-users' operations. These factors may intervene with each other such as the hardware is outdated and on top of it, the installed software needs new patches to avoid the attack. Users' operations such as disabling certain security configurations, additionally invalidates the software updates. A simple hardware or software update cannot address the security issue. Instead, a combined strategy is required for solving the problem. The keyword-based queries provide discrete answers, which require the users to explore a more comprehensive solution.

Comparatively, by leveraging the GSE 120, the latent correlations from a pile of bug reports such as a first bug report 822*a* and a second bug report 822*b* and measures taken to alleviate the issues are revealed through the learned security knowledge graph representations. The generated solution graph not only presents the most possible solutions for the security issues 820 but also make it possible to extract the most significant treatment from the huge pile of related and unrelated responses. The generated solution graph addresses multiple security vulnerabilities 802*a-r*.

Specifically, the customized contextualization helps to refine the graph searching scope, and to some extent tunes the solutions within each enterprise's framework and excludes those solutions that are beyond the enterprise's setting.

For instance, a critical security advisory or security alert is detected on both enterprise A's switch and enterprise B's switch. Since the supporting license features for enterprise A and enterprise B are different, the recommended solution graphs are also different. Given the ever-evolving threat landscape, security operations are overloaded with numerous security incidents and trying to keep abreast with the latest threats. Effectively correlation analyzing large volumes of diverse alert or event data brings opportunities to identify issues. By searching different dimensions of security information in separate knowledge entities, it lacks synergies between various dimensions. The GSE 120 transforms the correlations that exist among different security knowledge graphs into an expert model, which rebuilds the scene of a series of security alerts, and at the same time, output the corresponding solutions.

Figure 8:
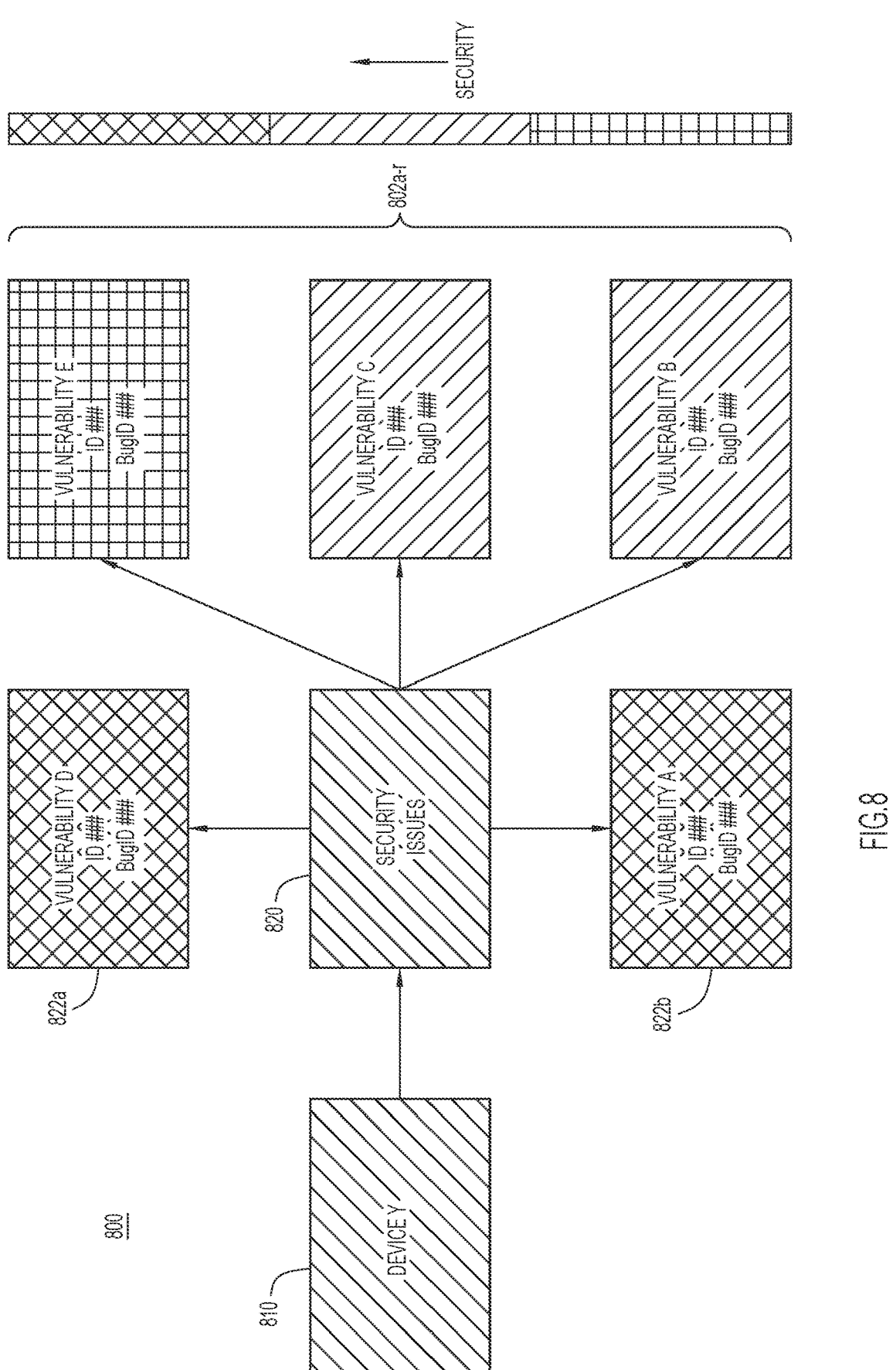
FIG. 8 is a diagram illustrating a security issue graph that involves multiple security vulnerabilities, according to an example embodiment.
Figure 9:
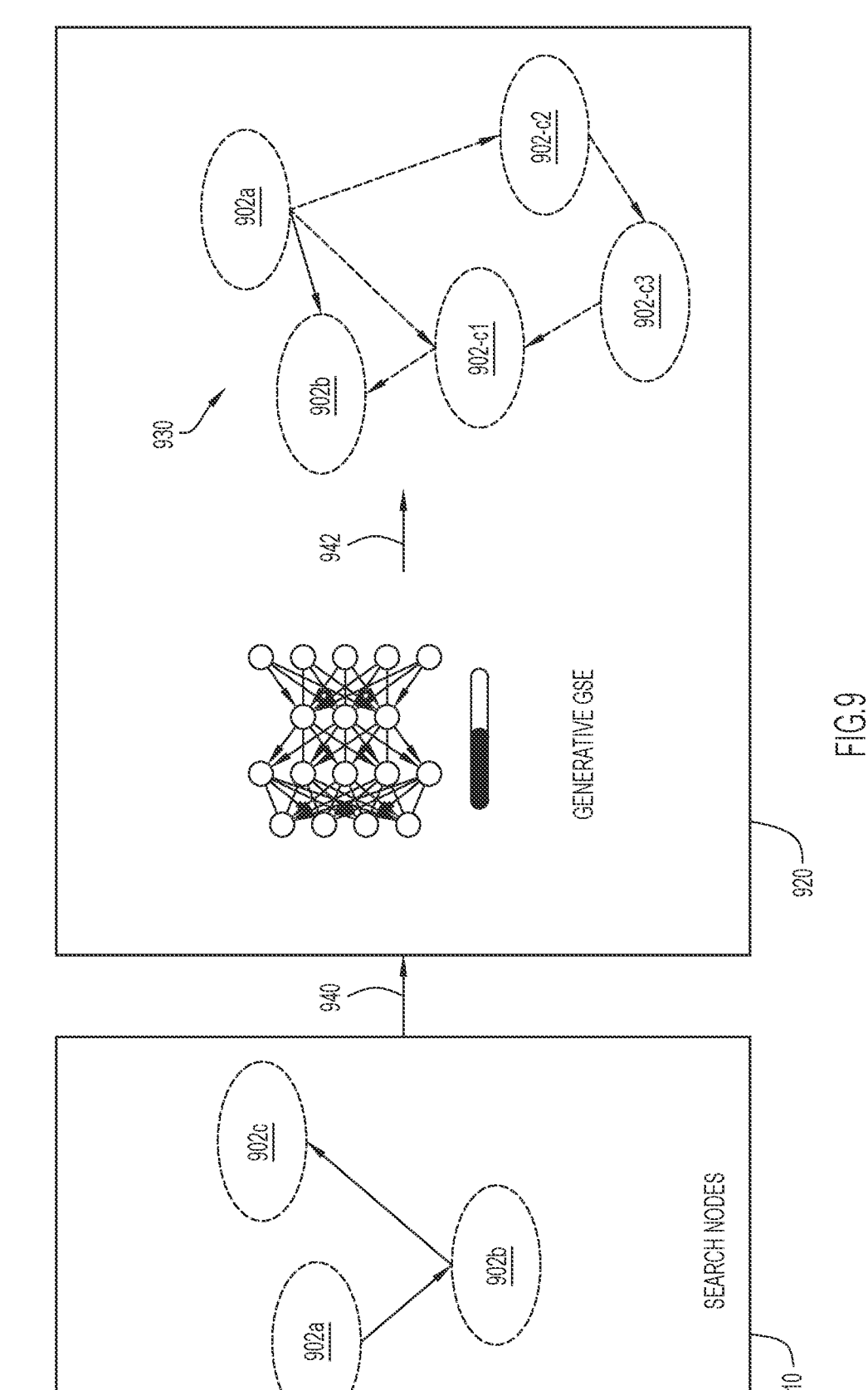
FIG. 9 is a flow diagram illustrating a generative method for generating graph search results that include expanded and relinked security solution recommendations, according to an example embodiment.

With continued reference to FIG. 8, FIG. 9 is a flow diagram illustrating a generative method 900 for generating graph search results that include expanded and relinked security solution recommendations, according to an example embodiment. The generative method 900 involves search nodes 910 and a generative GSE 920 such as the GSE 120 of FIG. 1 that generates a solution graph 930.

The solution graph 930 includes security solution recommendations related to devices and/or services provided in the search query. Specifically, at 940, a multi-query search inquiry, input by a user and transformed into search nodes 910 such as first search element 902*a*, second search element 902*b*, and third search element 902*c*, and are input into the generative GSE 920.

At 942, the generative GSE 920 applies graph generative pre-trained transformers to generate the solution graph 930. The solution graph 930 excludes the third search element 902*c*, but includes other elements derived based on performing generative GSE searching such as additional elements 902-*c*1, 902-*c*2, and 902-*c*3. The original queries include common vulnerabilities (i.e., the first search element 902*a*), weakness (i.e., the second search element 902*b*), and common attacks (i.e., the third search element 902*c*). The solution graph rules out the possibility of potential attack risk and provide other implicitly existing weakness which could potentially incur risks on the enterprise assets, such as elements 902-*c*1, 902-*c*2 and 902-*c*3.

Based on the solution graph 930, a cloud license interface in the cloud portal 100 may be generated, to help enterprises find the desire license features based on their asset portfolio (inventory data). Based on solution graph 930, the response may include recommendations for redundant features across enterprise devices and the license features updating strategies.

The techniques presented herein provide a generative knowledge search engine i.e., the GSE. The GSE generates a solution-driven knowledge graph completion framework to optimize user's-intention based on multi-queries in a network domain. The GSE is trained in a task-agnostic fashion from heterogeneous network graph data (e.g., using network domain knowledge data 222 of FIG. 4). The graph GPT component of the GSE utilizes pre-embedded user's intention schema (contextual schema) and a post ensemble module (i.e., the graph completion component 230) to directly output a single solution graph.

In one or more example embodiments, a multi queries search inquiry is contextualized into a plurality of query sub-graphs. The GSE directly utilizes the inventory data (enterprise's asset data) to contextualize the queries into multiple query sub-graphs. By employing the enterprise's network portfolio, the contextualized query sub-graphs embed the enterprise's intention to achieve deep customization.

In one or more example embodiments, the GSE uses meta-paths in these query sub-graphs to predict various completed solution graphs (i.e., hypotheses), which are the merged into the ultimate solution by the graph completion component 230. Specifically, unique graph generative pretrained transformers (G-GPT) are deployed that use meta-paths in the query sub-graphs to generate prediction graphs. The G-GPT generates predictions based on the input query sub-graphs. Instead of using unstructured natural language as input, the G-GPT converts input query sub-graphs into prediction graphs. The graph completion component then merges graph predictions (various hypotheses) generated by G-GPT to generate an end-to-end solution-driven graph. The G-GPT and graph completion component may use deep learning models on top of a network knowledge base (e.g., the network domain knowledge data).

In one or more example embodiments, the GSE transforms the knowledge graph search and completion tasks into a question and answer framework. In this question and answer framework, multiple questions may be input together as a search inquiry, which then generates a single response. Enterprise asset graph (e.g., devices, coverage, and telemetry data) is leveraged to contextualize the intention of the query as a customized or contextual schema that is specific to the user persona and the enterprise inventory data. The GSE is employed to ensemble multi-queries graph search and output a single solution graph that reflects the user's real intention and is based latent or hidden correlations learned by the G-GPT. Through the task-agnostic pre-training on network topology data (e.g., enterprise inventory data), the GSE learns the most intrinsic of latent correlations or hidden relationships and further reflects the strong-to-weak relations among different concepts and solutions. The outcomes of the GSE correspond to relational emphasized graph knowledge.

In one or more example embodiments, the GSE provides a response that is an end-to-end solution based search results. The response includes a direct answer to various questions in the multi-query search inquiry. The response may include insights, recommendations, and/or actions to perform for the enterprise network e.g., reconfigure one or more affected devices and apply various software updates and security patches on network devices related to the one or more affected devices. GSE may be deployed to assist in multiple downstream tasks related to knowledge graph completion. For example, in product/feature/license searching, the GSE predicts the most relevant products and license features that fit into the current asset portfolios of an enterprise. As another example, the GSE may be deployed to generate solution recommendations such as when a network security issue is identified, network-related configurations along with enterprise's historical security activities are contextualized into a customized schema (query sub-graphs) to generate correlated solution graphs that target specific network settings and address multiple security vulnerabilities determined in the enterprise network.

FIG. 10 is a flowchart illustrating a method 1000 of providing a response based on a solution graph generated by the GSE, according to an example embodiment. The response includes search results or a direct answer to multiple questions in the search query. The response is customized or tailored to the enterprise network and enterprise assets and is generated based on contextualization of user's intention in the search query.

The method 1000 involves, at 1002, obtaining at least one search query and inventory data that includes information about a plurality of enterprise network assets and configuration of an enterprise network.

The method 1000 further includes at 1004, generating a contextual schema based on the inventory data. The contextual schema includes a plurality of query sub-graphs indicative of an intention of the at least one search query.

The method 1000 further involves at 1006, generating a solution graph by performing machine learning with respect to the plurality of query sub-graphs and network domain knowledge data.

The method 1000 further involves at 1008, providing a response to the at least one search query based on the solution graph, wherein the response is specific to the enterprise network.

In one form, the at least one search query may include a multi-query search inquiry. The operation 1004 of generating the contextual schema may include generating an enterprise asset graph based on the inventory data. The enterprise asset graph may include one or more relationships among the plurality of enterprise assets in the inventory data. The operation 1004 of pruning the multi-query search inquiry based on the enterprise asset graph to generate the plurality of query sub-graphs specific to the enterprise network.

In one instance, the multi-query search inquiry may include a plurality of search queries that are input as one search by a user. The method 1000 may further involve determining a persona of the user. In the method 1000, pruning the multi-query search inquiry is further based on the persona of the user.

According to one or more example embodiments, the at least one search query may include a multi-query search inquiry. The operation 1004 of generating the contextual schema may include generating a plurality of search nodes based on a plurality of queries in the multi-query search inquiry and determining one or more relationships between the plurality of search nodes based on the inventory data. The operation 1004 may further include generating the plurality of query sub-graphs each indicative of the one or more relationships between the plurality of search nodes found in the inventory data.

In another form, the operation 1006 of generating the solution graph by performing the machine learning may include applying a pre-trained artificial intelligence model to the network domain knowledge data to generate the solution graph based on the plurality of query sub-graphs.

In yet another form, the operation 1006 of generating the solution graph by performing the machine learning may include applying a pre-trained artificial intelligence model to the network domain knowledge data to generate the solution graph based on the plurality of query sub-graphs.

In one instance, the operation 1006 of generating the solution graph by performing the machine learning may include generating a plurality of prediction graphs by training the plurality of query sub-graphs using a plurality of graph generative pre-trained transformers. The plurality of prediction graphs may be expanded reconstructed graphs of the plurality of query sub-graphs based on learned relationships and the network domain knowledge data.

According to one or more example embodiments, the operation 1006 of generating the solution graph by performing the machine learning may include merging the plurality of prediction graphs based on one or more common patterns to generate the solution graph.

In one form, the method 1000 may further include generating the response that includes an end-to-end solution to each query in a multi-query search inquiry.

In another form, the operation 1008 of providing the response may include configuring at least one network asset in the enterprise network based on the solution graph.

According to one or more example embodiments, the operation 1008 of providing the response may include providing one or more network solution recommendations that identify one or more enterprise assets and suggested network related configurations for the enterprise network.

Figure 11:
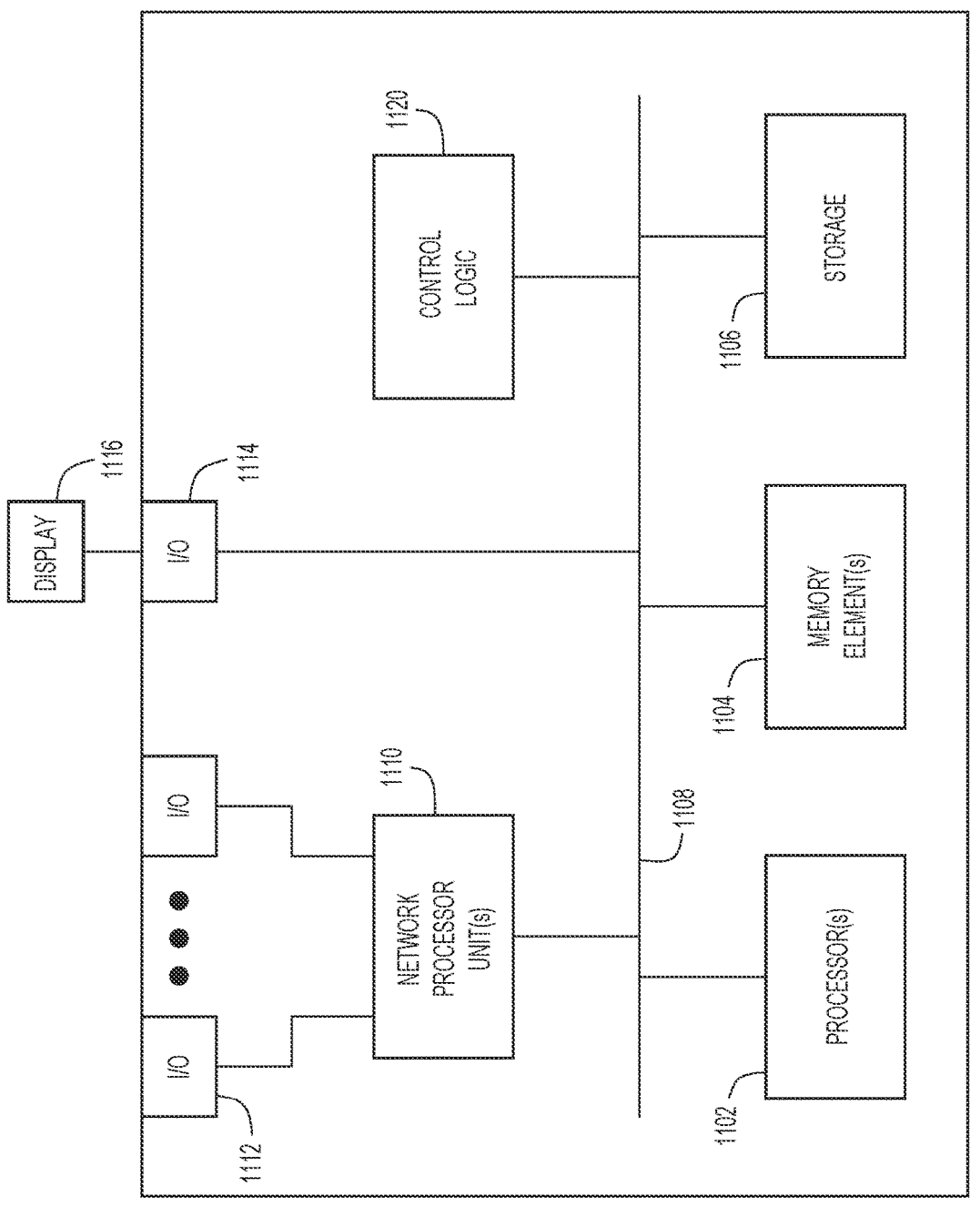
FIG. 11 is a hardware block diagram of a computing device that may perform functions associated with any combination of operations in connection with the techniques depicted and described in FIGS. 1-10, according to various example embodiments.

FIG. 11 is a hardware block diagram of a computing device 1100 that may perform functions associated with any combination of operations in connection with the techniques depicted in FIGS. 1-10, according to various example embodiments, including, but not limited to, operations of the cloud portal 100 and/or the GSE 120 of FIGS. 1-10. It should be appreciated that FIG. 11 provides only an illustration of one embodiment and does not imply any limitations with regard to the environments in which different embodiments may be implemented. Many modifications to the depicted environment may be made.

In at least one embodiment, computing device 1100 may include one or more processor(s) 1102, one or more memory element(s) 1104, storage 1106, a bus 1108, one or more network processor unit(s) 1110 interconnected with one or more network input/output (I/O) interface(s) 1112, one or more I/O interface(s) 1114, and control logic 1120. In various embodiments, instructions associated with logic for computing device 1100 can overlap in any manner and are not limited to the specific allocation of instructions and/or operations described herein.

In at least one embodiment, processor(s) 1102 is/are at least one hardware processor configured to execute various tasks, operations and/or functions for computing device 1100 as described herein according to software and/or instructions configured for computing device 1100. Processor(s) 1102 (e.g., a hardware processor) can execute any type of instructions associated with data to achieve the operations detailed herein. In one example, processor(s) 1102 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 1104 and/or storage 1106 is/are configured to store data, information, software, and/or instructions associated with computing device 1100, and/or logic configured for memory element(s) 1104 and/or storage 1106. For example, any logic described herein (e.g., control logic 1120) can, in various embodiments, be stored for computing device 1100 using any combination of memory element(s) 1104 and/or storage 1106. Note that in some embodiments, storage 1106 can be consolidated with one or more memory elements 1104 (or vice versa), or can overlap/exist in any other suitable manner.

In at least one embodiment, bus 1108 can be configured as an interface that enables one or more elements of computing device 1100 to communicate in order to exchange information and/or data. Bus 1108 can be implemented with any architecture designed for passing control, data and/or information between processors, memory elements/storage, peripheral devices, and/or any other hardware and/or software components that may be configured for computing device 1100. In at least one embodiment, bus 1108 may be implemented as a fast kernel-hosted interconnect, potentially using shared memory between processes (e.g., logic), which can enable efficient communication paths between the processes.

In various embodiments, network processor unit(s) 1110 may enable communication between computing device 1100 and other systems, entities, etc., via network I/O interface(s) 1112 to facilitate operations discussed for various embodiments described herein. In various embodiments, network processor unit(s) 1110 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1100 and other systems, entities, etc. to facilitate operations for various embodiments described herein. In various embodiments, network I/O interface(s) 1112 can be configured as one or more Ethernet port(s), Fibre Channel ports, and/or any other I/O port(s) now known or hereafter developed. Thus, the network processor unit(s) 1110 and/or network I/O interface(s) 1112 may include suitable interfaces for receiving, transmitting, and/or otherwise communicating data and/or information in a network environment.

I/O interface(s) 1114 allow for input and output of data and/or information with other entities that may be connected to computing device 1100. For example, I/O interface(s) 1114 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 1116, a display screen, or the like.

In various embodiments, control logic 1120 can include instructions that, when executed, cause processor(s) 1102 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a memory, a network interface configured to enable network communications and a processor. The processor is configured to perform a method that includes obtaining at least one search query and inventory data that includes information about a plurality of enterprise assets and configuration of an enterprise network. The method further includes generating a contextual schema based on the inventory data. The contextual schema includes a plurality of query sub-graphs indicative of an intention of the at least one search query. The method further includes generating a solution graph by performing machine learning with respect to the plurality of query sub-graphs and network domain knowledge data and providing a response to the at least one search query based on the solution graph. The response is specific to the enterprise network.

In yet another example embodiment, one or more non-transitory computer readable storage media encoded with instructions are provided. When the media is executed by a processor, the instructions cause the processor to execute a method that involves obtaining at least one search query and inventory data that includes information about a plurality of enterprise assets and configuration of an enterprise network. The method further involves generating a contextual schema based on the inventory data. The contextual schema includes a plurality of query sub-graphs indicative of an intention of the at least one search query. The method further includes generating a solution graph by performing machine learning with respect to the plurality of query sub-graphs and network domain knowledge data and providing a response to the at least one search query based on the solution graph. The response is specific to the enterprise network.

In yet another example embodiment, a system is provided that includes the apparatus and operations explained above with reference to FIGS. 1-11.

The programs described herein (e.g., control logic 1120) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or nonvolatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 1106 and/or memory elements(s) 1104 can store data, software, code, instructions (e.g., processor instructions), logic, parameters, combinations thereof, and/or the like used for operations described herein. This includes the storage 1106 and/or memory elements(s) 1104 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X. Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

obtaining at least one search query and inventory data that includes information about a plurality of enterprise assets and configuration of an enterprise network;

generating a contextual schema based on the inventory data, wherein the contextual schema includes a plurality of query sub-graphs indicative of an intention of the at least one search query and are generated based on one or more latent correlations among the plurality of enterprise assets indicated in the inventory data, and wherein the plurality of query sub-graphs include meta-paths representing relations between portions of the at least one search query obtained from the inventory data;

generating a plurality of prediction graphs by machine learning models expanding the plurality of query sub-graphs, wherein the plurality of prediction graphs include additional nodes representing domain knowledge data connected to leaf nodes of the plurality of query sub-graphs and reconstructed meta-paths, and wherein the additional nodes and reconstructed meta-paths are determined based on learned relationships and network domain knowledge data;

generating a solution graph by merging the plurality of prediction graphs; and providing a response to the at least one search query based on the solution graph, wherein the response is specific to the enterprise network.

2. The method of claim 1, wherein the at least one search query includes a multi-query search inquiry, and generating the contextual schema includes:

generating an enterprise asset graph based on the inventory data, wherein the enterprise asset graph includes one or more relationships among the plurality of enterprise assets in the inventory data; and pruning the multi-query search inquiry based on the enterprise asset graph to generate the plurality of query sub-graphs specific to the enterprise network.

3. The method of claim 2, wherein the multi-query search inquiry includes a plurality of search queries that are input as one search by a user and further comprising:

determining a persona of the user, wherein pruning the multi-query search inquiry is further based on the persona of the user.

4. The method of claim 1, wherein the at least one search query includes a multi-query search inquiry, and generating the contextual schema includes:

generating a plurality of search nodes based on a plurality of queries in the multi-query search inquiry;

determining one or more relationships between the plurality of search nodes based on the inventory data; and generating the plurality of query sub-graphs each indicative of the one or more relationships between the plurality of search nodes in the inventory data.

5. The method of claim 1, wherein generating the solution graph includes:

applying a pre-trained artificial intelligence model to the network domain knowledge data to generate the solution graph based on the plurality of query sub-graphs.

6. The method of claim 1, wherein generating the plurality of prediction graphs includes:

generating the plurality of prediction graphs by training the plurality of query sub-graphs using a plurality of graph generative pre-trained transformers.

7. The method of claim 1, wherein generating the solution graph includes:

merging the plurality of prediction graphs based on one or more common patterns to generate the solution graph.

8. The method of claim 7, further comprising:

generating the response that includes an end-to-end solution to each question in a multi-query search inquiry.

9. The method of claim 1, wherein providing the response includes:

configuring at least one network asset in the enterprise network based on the solution graph.

10. The method of claim 1, wherein providing the response includes:

providing one or more network solution recommendations that identify one or more enterprise assets and suggested network related configurations for the enterprise network.

11. An apparatus comprising:

a memory;

a network interface configured to enable network communications; and a processor, wherein the processor is configured to perform a method comprising:

obtaining at least one search query and inventory data that includes information about a plurality of enterprise assets and configuration of an enterprise network;

generating a contextual schema based on the inventory data, wherein the contextual schema includes a plurality of query sub-graphs indicative of an intention of the at least one search query and are generated based on one or more latent correlations among the plurality of enterprise assets indicated in the inventory data, and wherein the plurality of query sub-graphs include meta-paths representing relations between portions of the at least one search query obtained from the inventory data;

generating a plurality of prediction graphs by machine learning models expanding the plurality of query sub-graphs, wherein the plurality of prediction graphs include additional nodes representing domain knowledge data connected to leaf nodes of the plurality of query sub-graphs and reconstructed meta-paths, and wherein the additional nodes and reconstructed meta-paths are determined based on learned relationships and network domain knowledge data;

generating a solution graph by merging the plurality of prediction graphs; and providing a response to the at least one search query based on the solution graph, wherein the response is specific to the enterprise network.

12. The apparatus of claim 11, wherein the at least one search query includes a multi-query search inquiry, and the processor is configured to generate the contextual schema by:

generating an enterprise asset graph based on the inventory data, wherein the enterprise asset graph includes one or more relationships among the plurality of enterprise assets in the inventory data; and pruning the multi-query search inquiry based on the enterprise asset graph to generate the plurality of query sub-graphs specific to the enterprise network.

13. The apparatus of claim 12, wherein the multi-query search inquiry includes a plurality of search queries that are input as one search by a user and the method further comprises:

determining a persona of the user, wherein the processor is further configured to prune the multi-query search inquiry based on the persona of the user.

14. The apparatus of claim 11, wherein the at least one search query includes a multi-query search inquiry, and the processor is configured to generate the contextual schema by:

generating a plurality of search nodes based on a plurality of queries in the multi-query search inquiry;

determining one or more relationships between the plurality of search nodes based on the inventory data; and generating the plurality of query sub-graphs each indicative of the one or more relationships between the plurality of search nodes in the inventory data.

15. The apparatus of claim 11, wherein the processor is configured to generate the solution graph by:

applying a pre-trained artificial intelligence model to the network domain knowledge data to generate the solution graph based on the plurality of query sub-graphs.

16. The apparatus of claim 11, wherein the processor is configured to generate the plurality of prediction graphs by:

training the plurality of query sub-graphs using a plurality of graph generative pre-trained transformers.

17. One or more non-transitory computer readable storage media encoded with software comprising computer executable instructions that, when executed by a processor, cause the processor to perform a method including:

obtaining at least one search query and inventory data that includes information about a plurality of enterprise assets and configuration of an enterprise network;

generating a contextual schema based on the inventory data, wherein the contextual schema includes a plurality of query sub-graphs indicative of an intention of the at least one search query and are generated based on one or more latent correlations among the plurality of enterprise assets indicated in the inventory data, and wherein the plurality of query sub-graphs include meta-paths representing relations between portions of the at least one search query obtained from the inventory data;

generating a plurality of prediction graphs by machine learning models expanding the plurality of query sub-graphs, wherein the plurality of prediction graphs include additional nodes representing domain knowledge data connected to leaf nodes of the plurality of query sub-graphs and reconstructed meta-paths, and wherein the additional nodes and reconstructed meta-paths are determined based on learned relationships and network domain knowledge data;

generating a solution graph by merging the plurality of prediction graphs; and providing a response to the at least one search query based on the solution graph, wherein the response is specific to the enterprise network.

18. The one or more non-transitory computer readable storage media according to claim 17, wherein the at least one search query includes a multi-query search inquiry, and the computer executable instructions cause the processor to generate the contextual schema by:

generating an enterprise asset graph based on the inventory data, wherein the enterprise asset graph includes one or more relationships among the plurality of enterprise assets in the inventory data; and pruning the multi-query search inquiry based on the enterprise asset graph to generate the plurality of query sub-graphs specific to the enterprise network.

19. The method of claim 1, wherein each of the plurality of query sub-graphs is a customized query graph to which at least two meta-paths are applied that represent respective relational hypotheses.

20. The method of claim 1, wherein the plurality of query sub-graphs are search nodes that are expanded to include the one or more latent correlations based on the inventory data.

\* \* \* \* \*